United States Patent
Fanselow et al.

(10) Patent No.: US 9,068,860 B2
(45) Date of Patent: Jun. 30, 2015

(54) METHOD FOR MANUFACTURE OF AN INDUCTIVE SENSOR

(75) Inventors: Christian Fanselow, Geringswalde (DE); Ingrid Wunderlich, Radebeul (DE); André Pfeifer, Schkopau (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 170 days.

(21) Appl. No.: 13/277,678

(22) Filed: Oct. 20, 2011

(65) Prior Publication Data

US 2012/0098550 A1   Apr. 26, 2012

(30) Foreign Application Priority Data

Oct. 22, 2010   (DE) .......................... 10 2010 042 832

(51) Int. Cl.
| | | |
|---|---|---|
| *G01R 3/00* | (2006.01) | |
| *H01F 7/00* | (2006.01) | |
| *G01D 5/20* | (2006.01) | |
| *G01D 11/24* | (2006.01) | |

(52) U.S. Cl.
CPC ............... *G01D 5/20* (2013.01); *Y10T 29/4902* (2015.01); *B23K 2201/36* (2013.01); *G01D 11/245* (2013.01)

(58) Field of Classification Search
USPC ................. 73/861.11; 228/253, 254; 324/654
See application file for complete search history.

(56) References Cited

U.S. PATENT DOCUMENTS

| | | | |
|---|---|---|---|
| 4,849,728 A | 7/1989 | Goll | |
| 5,207,105 A | 5/1993 | Fukunaga | |
| 7,170,385 B2* | 1/2007 | LaClair et al. | ................ 336/208 |
| 7,178,407 B2* | 2/2007 | Kappertz et al. | ........... 73/861.11 |
| 7,360,294 B2* | 4/2008 | LaClair et al. | .................. 29/595 |
| 2008/0028593 A1 | 2/2008 | Friedrichs | |
| 2008/0211489 A1* | 9/2008 | Reusing et al. | .......... 324/207.16 |
| 2009/0203269 A1* | 8/2009 | Jenne et al. | ................... 439/862 |
| 2011/0101967 A1* | 5/2011 | Kayserman et al. | ..... 324/207.15 |

FOREIGN PATENT DOCUMENTS

| | | |
|---|---|---|
| CN | 1048594 A | 1/1991 |
| DE | 35 30 288 A1 | 3/1987 |
| DE | 195 08 221 C1 | 9/1996 |
| DE | 196 18 631 A1 | 11/1997 |
| DE | 694 12 735 T2 | 1/1999 |
| DE | 20108646 U1 | 8/2001 |
| DE | 10 2007 009 994 A1 | 9/2008 |
| DE | 10 2009 018 644 A1 | 10/2010 |
| EP | 0 271 637 B1 | 6/1988 |

OTHER PUBLICATIONS

German Search Report.

* cited by examiner

*Primary Examiner* — Devang R Patel
(74) *Attorney, Agent, or Firm* — Bacon & Thomas, PLLC

(57) ABSTRACT

A method for manufacture of an inductive sensor, wherein coils are placed on both sides of a support plate surrounding an opening of the support plate, and the support plate with the coils is inserted into a housing. A sleeve is inserted through a first cavity of the housing through the opening of the support plate into the housing. In order to achieve a secure and temperature independent joint between the sleeve and the housing, the sleeve (5) is welded with the housing (2).

6 Claims, 1 Drawing Sheet

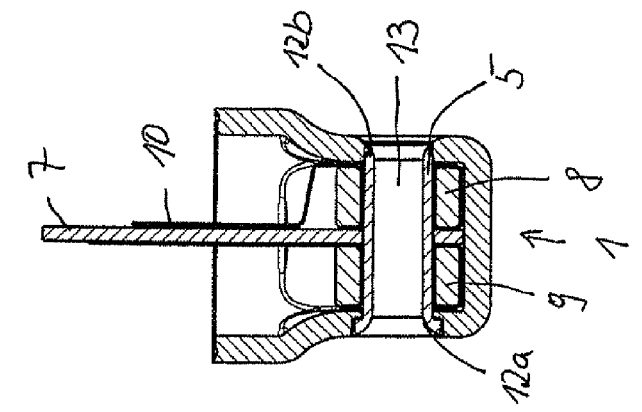
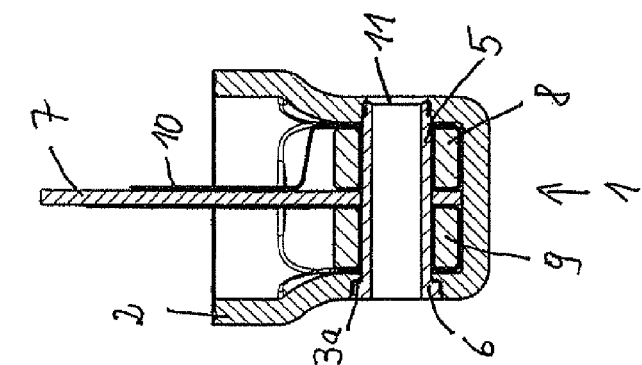
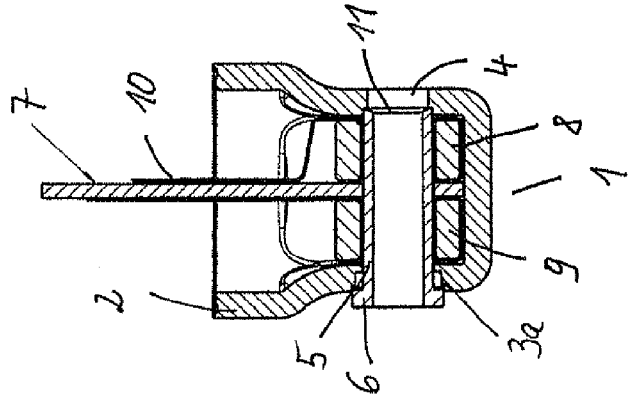
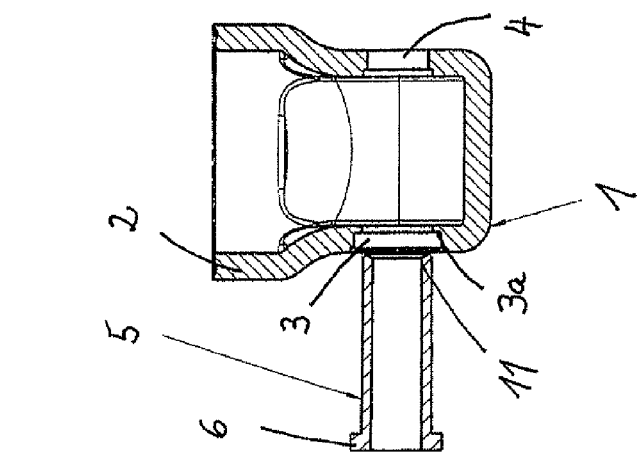

METHOD FOR MANUFACTURE OF AN INDUCTIVE SENSOR

TECHNICAL FIELD

The invention relates to a method for manufacture of an inductive sensor, wherein coils are placed on both sides of a support plate surrounding an opening of the support plate, and the support plate with the coils is inserted into a housing, and wherein a sleeve is inserted through a first cavity of the housing through the opening of the support plate into the housing.

BACKGROUND DISCUSSION

The coils of inductive conductivity sensors can be provided with a sensor housing in various ways. It is known to form a coil assembly, wherein the coils are first inserted via a cumbersome method into a separate coil housing, and then, in this coil housing, the coils are injection molded around with synthetic material. The assembly thus produced is then inserted into a sensor housing. The creation of the separate coil housing is necessary to protect the coils during the injection molding against high injection pressures and very high temperatures. Since the coils are very sensitive to pressure and temperature, in the case of this processing, besides a high preparation and assembly effort for the coil assembly, a high risk of rejects exists.

In another variant, the coils are premounted in a coil housing. The introduction of the coils into the coil housing is very complex, since the coils must be soldered to a cable assembly in the sensor housing. Then, onto the open side of the sensor housing, a lid is welded, which in the following working step must be milled. Besides the high preparation and assembly effort for the sensor assembly, a subsequent finishing of the weld seam is additionally necessary.

In the case of a known sensor, two coils are each arranged on a side of a circuit board, and the preinstalled circuit board is then inserted into the sensor housing. The circuit board includes, in such case, an opening, around which the coils, which are embodied as toroidal coils, are positioned. After insertion of the circuit board into the sensor housing, the housing is closed by a sleeve, which is inserted into the housing through a wall of the housing, and is led through the opening of the circuit board. The two ends of the sleeve are, in such case, adhered to the housing at the interfaces to the latter. The inner space of the sensor housing is subsequently filled with a potting compound. Besides the preparatory work for the bonding locations, which must be cleaned before the bonding process, a subsequent finishing of the bonded joint is also necessary. The bond gap which forms between the sleeve and housing has a different coefficient of thermal expansion compared to that of the housing, wherein, in the case of temperature fluctuation processes during insertion of the inductive sensor, the bond gap can be compromised. Moreover, the adhesive has a lesser chemical resistance than a plastic. For producing the two separate bonding locations, a complex treatment is necessary, which necessitates a higher consumption of time.

SUMMARY OF THE INVENTION

An object of the invention is thus to provide a method for manufacture of an inductive sensor, in the case of which the treatment during the connection process of the sleeve with the housing is simplified, and a stable connection between sleeve and housing is achieved while preventing a high amount of preparatory work.

The object is achieved according to the invention by welding the sleeve with the housing. This has the advantage that a homogeneous, material-bonded connection is achieved. During the manufacturing method, the coils are not influenced by pressure and temperature, and, consequently, their structure is not influenced by these outside influences. A simple coil conception is possible on the support plate, especially as regards the temperature sensor and the electronics. Via the welding, a material-bonded connection between the sleeve and housing is achieved. An intermediate layer, such as an adhesive, is not present. By eliminating the intermediate layer, a damaging of the connection between the housing and sleeve is reliably suppressed.

Advantageously, the sleeve is placed from the outside on the first cavity of the housing, with a collar protruding out over the first cavity, wherein, during the welding, the collar of the sleeve is brought into the first cavity. Via the collar, an exact positioning of the sleeve in the housing is possible before the welding process, so that during the welding procedure, the collar can be inserted accurately into the cavity of the housing, which leads to a simplifying of the manufacturing process.

In an embodiment, the collar of the sleeve is pressed into the first cavity during the welding. Via application of pressure onto the collar of the sleeve, the collar melts together with the cavity of the housing, whereby a planar surface of the outside of the housing is implemented, in the case of which no subsequent finishing is needed. The housing is thus closed off in a sealed manner flushly with the sleeve.

In a variant, before introduction of the collar of the sleeve into the first cavity, the first cavity is provided with a stepped inner diameter, in order to form an inwardly protruding shoulder. Via the shoulder on the inner diameter of the cavity of the housing, the penetration of the collar of the sleeve into the cavity during the welding is facilitated, since the exact position of the collar within the cavity is thereby predetermined. In such case, after the welding with the housing, the collar of the sleeve not only forms a sealed closure flushly with the outer surface of the housing, but also with the shoulder, i.e. the lower edge of the cavity. In this way, an exact positioning of the sleeve in the housing is easily predeterminable.

In a further development, the end of the sleeve located in the housing is placed in front of a second cavity of the housing, and is then brought into the second cavity during the welding of the sleeve with the housing. During introduction of the sleeve into the housing, the sleeve is positioned precisely in the housing through the opening of the support plate. Due to the collar lying on the first exterior of the housing, the end of the sleeve is also positioned within the housing precisely in front of the second cavity, which is formed on the second side of the housing lying opposite the first housing side. This end of the sleeve is also brought into the second cavity via a welding process, whereby the housing likewise enters at this position into a material-bonded connection between the end of the sleeve and the housing.

Advantageously, the first and second cavities of the housing are welded simultaneously with the collar and with the end of the sleeve. Thus, the two joints are formed in a single working step, which considerably shortens the manufacturing process of the sensor.

In an additional form of embodiment, the sleeve is connected with the housing by means of an ultrasonic welding method. This ultrasonic welding method enables not only the simultaneous welding of the collar and of the end of the sleeve with the housing, but likewise introduces the pressure required for pushing the collar of the sleeve into the first cavity. In this way, a sealed closure of the collar and of the end of the sleeve flushly with the surface of the housing of the sensor is produced.

In a further development, the two cavities of the housing, filled with the collar and/or the end of the sleeve are subsequently finished in the region of an outer radius. This is especially always required when the sleeve is used as an insert for flow through of a medium to be measured. Via the subsequent finishing, the joints have a smoother surface.

Advantageously, the outer radius of the collar inserted into the housing and/or the end of the sleeve is rounded from the outside to the inside in the lengthwise direction of the sleeve. This rounding improves the flow behavior of the measured medium flowing through the sleeve.

A further development of the invention relates to an inductive conductivity sensor, which is produced according to a method explained herein. As a result of the welding process, such a sensor is manufacturable in a very simple manner, and without a great deal of time consumed and without a complex treatment.

BRIEF DESCRIPTION OF THE DRAWINGS

The invention allows for numerous forms of embodiment. One of these will now be explained in greater detail on the basis of the appended drawing, the sole figure of which shows as follows:

FIG. 1a-1d show the different steps in the manufacture of an inductive conductivity sensor.

Similar features are designated with similar reference characters.

DETAILED DISCUSSION IN CONJUNCTION WITH THE DRAWINGS

FIG. 1 shows a sequence of steps for joining an inductive conductivity sensor with a housing.

FIG. 1a shows the sensor shaft 1, which has a housing 2 made of synthetic material, e.g. plastic. The sensor shaft 1 has a hollow space (not further illustrated), which extends within the sensor shaft 1, and leads out on the one side into a cavity 3 of housing 2, and on the opposing side into a cavity 4 of housing 2. Into these cavities 3 and 4, in the case of which the first cavity 3 has a shoulder 3a, a flow insert should be inserted in the form of a sleeve 5, wherein sleeve 5 has an encircling collar 6, and is likewise made of synthetic material, e.g. plastic.

FIG. 1b shows the mount position before the welding of housing 2 of the sensor shaft 1 with the sleeve 5. First, a support plate 7 was inserted into the sensor shaft 1, wherein on both sides of the support plate 7, a coil 8 or a coil 9 is respectively arranged, wherein these coils are embodied as toroidal coils. The support plate 7 is preassembled with the coils 8 and 9 and an electronics and inserted into the hollow space of the sensor shaft 1. In such case, coils 8, 9 are connected via an electrical connection 10 with the support plate 7, which preferably takes the form of a circuit board.

Coils 8 and 9 surround an opening of support plate 7. After insertion of support plate 7 in the sensor shaft 1, sleeve 5 is led into the opening of support plate 7 through the toroidal coils 8, 9. This occurs through the first cavity 3 of the housing 2, wherein the surrounding collar 6 of sleeve 5 has a greater diameter than the first cavity 3. Considering this, collar 6 lies on the outside of housing 2.

The end 11 of sleeve 5 lies in the hollow space of sensor shaft 1, in front of the cavity 4 of housing 2. Via the protruding of the encircling collar 6 on the first cavity 3, a gap between the housing outer wall and a shoulder 3a in the region of the cavity 3 remains within the cavity 3. In the case of the following welding procedure, which is performed as an ultrasonic welding, this gap is filled by collar 6 of sleeve 5.

The welding procedure is presented in FIG. 1c. By means of ultrasonic welding, the collar 6 of sleeve 5, as well as the end 11 of sleeve 5 and the edge regions of cavities 3 and 4, become liquid, wherein collar 6 and end 11 of the flow insert 5 are pressed into the cavities 3 and 4. In such case, as is evident from FIG. 1c, collar 6 completely fills the gap which has resulted relative to shoulder 3a in cavity 3. Both collar 6 as well as also end 11 of sleeve 5 form a sealed closure with the respective outer surface of the housing 2. Protrusion 6 lies, in such case, completely on the shoulder 3a, whereby a material-bonded, interlocking connection is produced between sleeve 5 and housing 2 without any intermediate layer. The same is true for end 11 of sleeve 5, which is welded with cavity 4. A mirror-symmetric sensor shaft 1 is thus created, wherein the welding procedure for both joints of sleeve 5 with the housing 2 at cavities 3, 4 is performed in one working step. In such case, the first joint is formed by the connection between housing 2 and collar 6, while the second joint is formed by the connection of end 11 of flow insert 5 with housing 2. In such case, the ultrasonic welding always involves synthetic material welded connections, since housing 2 and sleeve 5 are in each case composed of a synthetic material, e.g. a thermoplastic.

In FIG. 1d, the weld seam is finished, wherein possibly raised particles are removed by machining. Since the sleeve 5 serves in the case of an inductive conductivity sensor for allowing a liquid measured medium to be led through in the inner space of sleeve 5, the radii of sleeve 5 are rounded in the regions of collar 5 and end 11 toward the flow duct 13 of sleeve 5. These roundings 12a or 12b are, in such case, performed from the outside to the inside, toward flow duct 13 of sleeve 5. These roundings 12a, 12b improve the flow behavior of the measured medium flowing through the hollow space 13.

The invention claimed is:

1. A method for manufacture of an inductive sensor, comprising the steps of:
    placing coils on both sides of a support plate surrounding an opening of the support plate;
    inserting the support plate with the coils into a housing;
    inserting a sleeve through a first cavity of the housing through the opening of the support plate into the housing; wherein:
    the sleeve is placed from the outside on the first cavity of the housing, with a collar protruding out over the first cavity;
    welding the sleeve with the housing, wherein the collar of the sleeve is pressed into the first cavity during the welding via application of pressure onto the collar of the sleeve, and during the welding, the collar of the sleeve is brought into the first cavity;
    the end of the sleeve located in the housing is placed in front of a second cavity of the housing, and then is brought into the second cavity during the welding of the sleeve with the housing; wherein
    by means of welding, the collar of the sleeve, as well as the end of the sleeve and edge regions of the first and second cavity, become liquid; wherein the collar is pressed into the first cavity and the end of the sleeve is pressed into the second cavity; and the first cavity is welded to the collar, while the second cavity is welded to the end of the sleeve, wherein both weld joints are formed simultaneously in a single working step.

2. The method as claimed in claim 1, wherein:
the collar of the sleeve is pressed into the first cavity during the welding.

3. The method as claimed in claim 1, wherein:
before introduction of the collar of the sleeve into the first cavity, the first cavity is provided with an inwardly protruding shoulder.

4. The method as claimed in claim 1, wherein:
the sleeve is connected with the housing by means of an ultrasonic welding method.

5. The method as claimed in claim 1, wherein:
after the welding, the sleeve welded with the housing is finished in region of the outer radius in the region of the two cavities of the housing filled with the collar and/or the end of the sleeve.

6. The method as claimed in claim 1, wherein:
the outer radius of the collar inserted into the housing and/or the end the sleeve is rounded from outside to inside in a lengthwise direction of the sleeve.

\* \* \* \* \*